MULTIPLE RESPONSE RESOLVER APPARATUS

Filed June 20, 1963 2 Sheets-Sheet 1

INVENTOR.
KENNETH E. BATCHER
BY
ATTORNEY

INVENTOR.
KENNETH E. BATCHER

BY [signature]

ATTORNEY

United States Patent Office 3,300,762
Patented Jan. 24, 1967

3,300,762

MULTIPLE RESPONSE RESOLVER APPARATUS

Kenneth E. Batcher, Champaign, Ill., assignor to Goodyear Aerospace Corporation, a corporation of Delaware Filed June 20, 1963, Ser. No. 289,196
2 Claims. (Cl. 340—172.5)

This invention relates to a multiple response resolver adapted to select a desired signal or signals from a plurality of response signals, and more particularly is adapted for use in locating word addresses in a digital memory storage system of all words corresponding to a compare word as determined by an associative memory function.

In an associative memory function a signal is generated for each word in the digital memory storage system which indicates whether or not each particular word corresponds with the compare word. It is possible that any number of words might correspond to the compare word so that anywhere from none to all of these signals might be energized. For most applications of an associative memory it is necessary to locate the address of only one of these corresponding words, however at times it may be necessary to locate the address of all corresponding words. Nevertheless, a device is needed to resolve all the responses to a comparison and to select one and indicate the address therefore.

Several methods have been proposed to accomplish this function, but they share the common disadvantages of being slow in operation, large in size, and expensive to construct. One of these mehtods which involves doing several comparisons to get one word is presented by E. H. Frei and J. Goldberg in "A Method for Resolving Multiple Responses in a Parallel Search File," IRE Trans. on Electrical Computers, volume EC–10, No. 4, December 1961, page 718. For this system application, the time required to do several comparisons for one response will be too long, which is undesirable.

A further system which presents itself is a straight-forward logical system wherein each compare signal from a memory word sets a solid state device. Connected to the solid state device is a logic structure which consists of a plurality of cascaded AND circuits which in response to a ripple signal perform the function of picking out the first solid state device which is set in response to the compare signal. However, for large memories the time delay experienced by a signal in traveling through the cascaded AND circuits may become intolerable. Further, since a solid state device must be associated with each word in memory, plus cascaded AND gate circuits to ripple the solid state devices, for a large digital memory storage system the amount of equipment necessary to locate word address of those words corresponding to the compare word becomes extremely large and generally unmanageable.

It is the general object of the invention to avoid and overcome the foregoing and other difficulties of and objections to prior art practices by the provisions of a multiple response resolver utilizing a pair of parallel and bit aligned core planes which are simultaneously set by compare signals, and which can be interrogated to locate word address of the first word corresponding to the compare word in a short and consistent time interval, and which can locate each subsequent word corresponding to the compare word in subsequent similar time intervals.

A further object of the invention is to provide a multiple response resolver which is highly effective in operation, extremely fast and consistent in time of operation, which can be very small in size, and which is relatively low in cost.

A further object of the invention is to provide a multiple response resolver which can operate in two or more dimensions as required to determine word address of any word corresponding to the compare word in an associative memory function of a digital memory storage system having two or more dimensions.

The aforesaid objects of the invention, and other objects which will become apparent as the description proceeds, are achieved by providing in a multiple response resolver utilized to analyze sense signals from each word storage in a digital computer resultant from an associative memory function the combination of a first plane containing standard toroidal cores mounted in columns and rows therein, a second plane mounted parallel to said first plane containing standard toroidal cores mounted in columns and rows therein in alignment with the columns and rows in said first plane, means to set every core in both planes to a non-compare value, electrical winding means on each core and connecting corresponding cores in each plane in series, means to pulse a sense signal through the electrical winding means of each core in the first plane to thereby set every core in both planes to the proper state indicated by its individual sense signal, means to sense simultaneously each column of cores in the first plane to detect which columns have cores therein which have been set by a compare sense signal to indicate compare, means to select one of the columns of cores in the first plane which indicates compare, means to pulse the column of cores in the second plane corresponding to the column of cores in the first plane which indicates compare, means to sense each row in the column in the second plane at the same time as the pulse from last said means to determine which rows indicate compare during the pulse from last said means, and means to select one of the rows in the second plane which indicates compare.

For a better understanding of the invention reference should be had to the accompanying drawings, wherein.

The relationship of a multiple response resolver to a digital memory storage system adapted for the associative memory function is clearly set forth in patent application Serial No. 280,391 dated May 14, 1963, entitled "Associative Memory System and Methods." Reference should be had to this application to better comprehend the relationship of the multiple response resolver to the storage system.

Figure 1:
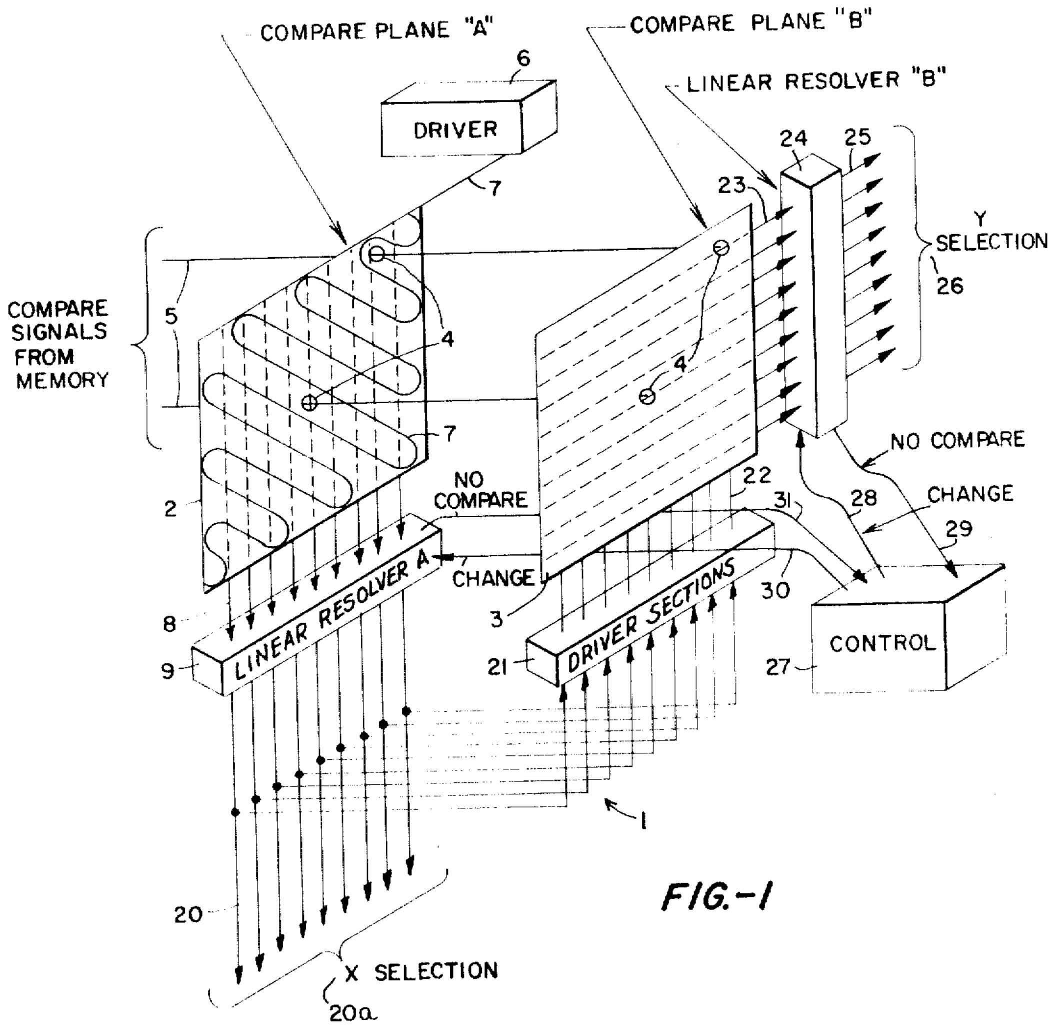
FIGURE 1 is a perspective block diagram of a multiple response resolver utilizing the principles of the invention.

With specific reference to the form of the invention illustrated in FIGURE 1 of the drawings, the numeral 1 indicates generally a multiple response resolver for a two dimensional system which includes a first compare plane labelled compare plane A, as indicated by numeral 2, and a second compare plane labelled compare plane B, as indicated by numeral 3. The compare planes 2 and 3 are identical, and in the embodiment of the invention illustrated in FIGURE 1, the planes comprise a plurality of toroidal cores, with only two in each plane shown, as indicated generally by numeral 4. The cores 4 are arranged in vertical columns, and horizontal rows in the planes 2 and 3, and are physically aligned with each other, as illustrated.

A plurality of sense wires, indicated generally by numeral 5, each representing a word in memory are threaded through correspondingly aligned cores 4 in the planes 2 and 3, as indicated in FIGURE 1.

In order to reset compare plane A indicated by numeral 2, after the cores 4 therein have been set by compare signals 5 from memory, an electrical driver unit, indicated by block 6, is provided to thread through all of the compare plane A as by wire 7. The function of the electrical driver 6 is to reset all the cores 4 in the core plane A to the non-compare value after desired address location has been achieved.

In order to determine if any cores 4 in compare plane A have been set by compare signals 5 to indicate compare, a plurality of sense wires, indicated generally by numeral 8, are provided to thread through each column of cores 4 in plane A to thereby connect all the cores in each column in series. Usually, the sense wires 8 are read during the reset pulse from driver 6 to determine which cores 4 were set indictaing compare signals. However, the sense wires 8 could be read during the pulses from memory to set both core planes to indicate compare signals.

Figure 2:
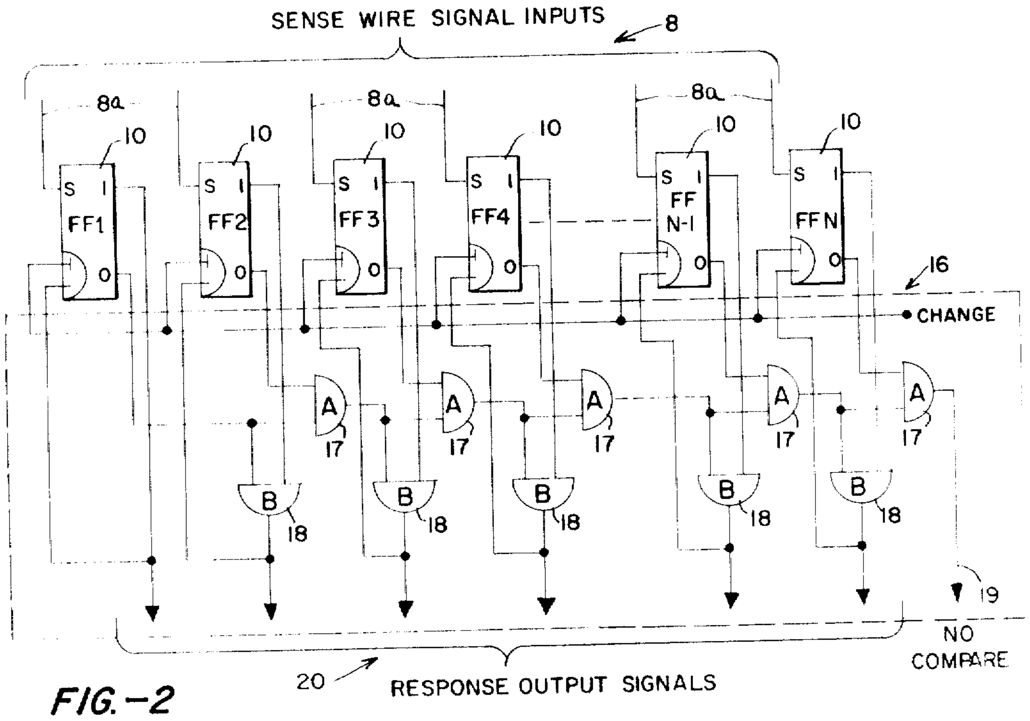
FIGURE 2 is a schematic block diagram of one of the linear resolvers used in the resolver apparatus of FIGURE 1.

The sense wires 8 provide inputs to a linear resolver A, indicated by numeral 9. In order to understand the operation of linear resolver A, reference should be had to FIGURE 2, wherein the sense wire inputs, indicated generally by numeral 8, have each individual input wires **8*a* setting a standard solid state device 10**.

Figure 3:
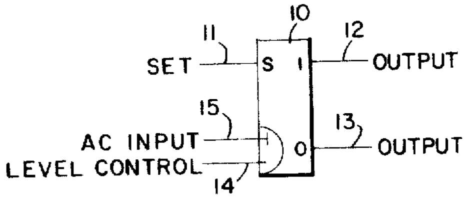
FIGURE 3 is a block diagram of a simple solid state device, which devices are utilized in the linear resolvers, and which can be utilized in the compare planes of FIGURE 1.

A typical solid state device 10 is indicated in FIGURE 3, and essentially contains electronic means to receive a set signal 11 to thereby store a one output signal 12 or a zero output signal 13. A level control 14 is provided to determine whether or not A.C. input 15 has any effect. An A.C. input 15 is provided to reset the solid state device 10 when desired.

Therefore, as stated previously each sense input signal carrying a compare signal, will set its solid state device 10 to indicate a one output 12 to show compare. Connected to the solid state devices 10 is a logic structure indicated as a whole by dotted line block 16, which structure essentially picks out the first solid state device which is set to a one output 12 indicating compare. The structure 16 consists of a plurality of cascaded AND circuits 17, labelled A. Each AND circuit 17 has an input from the zero output 13 of its associated solid state device 10 and another input from the previous AND circuit 17. In conjunction with the cascaded AND circuit 17, there is also a set of AND circuits 18, labelled B, each with an input from the one output 12 of its associated solid state device 10 and another input from the previous AND circuit 17. Each AND circuit 18 will have an output if and only if all previous solid state devices are in the zero state and its associated solid state device 10 is in the one state. Therefore, one and only one AND circuit 18 will have an output. If no solid state devices 10 are set, indicating non-compare, no AND circuits 18 will have an output. Instead the "no compare" output signal from the last AND circuit 17, indicated by numeral 19, will be on indicating that no words in memory corresponded to the compare word.

It is therefore seen that one, and only one, of the output signals of the linear resolver A, indicated by block 9 in FIGURE 1, will be on if any compare signals are present. This signal indicates the first column in compare plane A which carries a compare signal. Therefore, a column in compare plane A indicating a compare signal has been determined which therefore locates word address in that direction, which could be called the X axis. Thus, one output signal on the output signal lines indicated generally by numeral 20, from the linear resolver A determines the X axis location **20*a*** of the first compare signal located.

The single output signal 20 from resolver A also energizes a driver section 21 for compare plane B. The driver section 21 is similar to driver 6, however since it is only energized by one of the output lines 20 corresponding to the compare column in compare plane A it only drives that corresponding column in compare plane B. Therefore, each core in the corresponding column in compare plane B is driven with a compare pulse through its associated drive wire 22 which is one of a plurality of drive wires as indicated generally by numeral 22. The drive pulse tends to set the cores in the corresponding column to the non-compare setting. Therefore, those cores which have already been set to the compare state will change state during the drive pulse from the driver section 21 through the associated drive wire 22.

Each row of cores 4 in compare plane B is series connected, as indicated by sense wires 23, which feed solid state devices 10 in a linear resolver B, indicated by numeral 24. The operation of linear resolver B is similar to that described previously for linear resolver A, indicated by numeral 9, so that the sense wires 23 will pick up the indication of which rows of cores in only the single column driven by the driver section 21 to thereby determine in the linear resolver B which is the first row to indicate compare. The single output from linear resolver B on one of the output lines 25 therefore indicates the Y selection 26 or Y axis address of the first word in memory corresponding to the compare word. Therefore, the Y selection 26 combined with the X selection **20*a*** determines the exact location of the first word in memory corresponding to the compare word.

Hence, it is seen that the linear resolver A indicated by numeral 9 has selected the first column in compare plane A containing compare responses and has placed in linear resolver B a "picture" of this column. By means of row sense wires 23 linear resolver B then selects the first response in the indicated column in compare plane B thus, the net result is that one X selection line and one Y selection line in the compare state have been determined. These lines indicate the X, Y coordinates of the first responding word in memory. These lines can be used to drive an address encoder if the address of this word is desired or it could be used directly to select this word in the associated memory for readout, or for any other purpose.

To step to the next compare word, if another compare word is present, the control circuit, indicated generally by block 27 pulses the "change" line 28 to resolver B. This will cause the next response in the designated column in compare plane B to be selected. If a no compare signal 29 results from this change in resolver B24 it means that all responses in the column in compare plane B have been selected. When this happens the control circuit 27 pulses the change line 30 of resolver A. This causes resolver A to step to the next column containing responses. If a column is located, the output signal passes over lines 20, as previously described, and pulses the column driver in driver section 21 and again the "picture" of this next column is set in linear resolver B, through the row sense wires 23. It can be seen that by this means it is possible to step through all responding words in memory. When the no compare signal 31 of resolver A is energized, it indicates that all responses have been selected and the circuit is ready for the next associative memory function. At this time all cores in compare planes A and B, and all solid state devices 10 in linear resolvers A and B will be reset to the non-compare or zero condition, to begin the next resolver cycle.

The two-dimensional resolver, as described, requires two compare planes each containing as many cores as there are words in memory and two linear resolvers each of a length substantially equal to the square root of the number of words in memory. Thus, conventional sequential sampling of solid state devices 15 reduced by substantially two times the square root of the number of words in memory. Also, the number of solid state devices required is reduced by substantially the same amount. This effects considerable savings in time and amount of equipment. Further, the time required to select a compare signal becomes essentially constant making the time of the response resolver predictable.

The invention contemplates the use of standard solid state devices in place of the cores 4 in order to achieve much faster response time. The substitution of standard solid state devices for the toroidal cores 4 would not involve any change in the concept of the invention. Generally, the distinction between the use of solid state devices or cores is dependent on the size of the memory, the resolver speed required and the cost of construction. For most smaller memories the solid state devices might be practical, whereas for most large memories the cores are the most practical. The utilization of elastic switching techniques on the cores can greatly improve response time.

It can be seen that the two-dimensional system can be extended to other dimensions. A multi-dimensional system requires a compare plane and a resolver for each dimension. All the cores or solid state devices of the first plane are reset and the first resolver stores the information as to which zones contain responses. Then the first zone containing responses in the second plane is reset and sense wires readout the responses in each sub-zone. This process is continued until the location of the first response is pinpointed. The resolver output lines indicate the position of this word, and as has been explained for the two-dimensional system.

In general, there will be a practical limit to the number of dimensions that can be used. In the first plane all cores or solid state devices can be reset by one driver. In the second plane all storage devices in one zone can be reset at one time. In the third plane all storage devices in one sub-zone of one zone are reset, etc., so that the driving equipment becomes more complex as the number of dimensions is increased. The driver for a particular plane requires the information from all previous resolvers to reset the correct part of the plane.

It will be recognized that the objects of the invention have been achieved by providing compare planes in combination with linear resolvers to achieve X and Y axes address location to words in memory corresponding to the compare words, and that the address location is achieved in a very short and uniform amount of time, and which can utilize standard toroidal cores to eliminate the need for a complex linear resolver since on a per-word basis a few magnetic cores replaces the standard solid state device. Also, each and every word in memory corresponding to the compare word can be located in subsequent time intervals to complete the resolver function. Also, it is feasible to utilize the compare planes in a resolver of more than two dimensions.

While in accordance with the Patent Statutes one best known embodiment of the invention has been illustrated and described in detail, it is to be particularly understood that the invention is not limited thereto or thereby, but that the inventive scope is defined in the scope is defined in the appended claims.

What is claimed is:

1. In a two dimensional multiple response resolver utilized to analyze sense signals from each word stored in a digital storage system resultant from an associative memory function the combination of a first plane containing standard toroidal cores mounted in columns and rows therein corresponding to the columns and rows of words in the digital storage system, a second plane mounted parallel to said first plane containing standard toroidal cores mounted in columns and rows therein in alignment to each column and row in said first plane, means to set every core in both planes to a non-compare value, electrical winding means on each core and connecting corresponding cores in each plane in series, means to pulse a sense signal corresponding to a word in memory indicating compare to its corresponding core in the first plane through the electrical winding means thereon to thereby set the respective cores in both planes to the proper state indicated by the sense signal, means to simultaneously sense each column of cores in the first plane with a destructive read-out to detect which columns have cores therein indicating compare, means to select one of the column of cores in the first plane which indicates compare, means to destructively pulse the column of cores in the second plane corresponding to the selected column of cores in the first plane which indicates compare, means to sense each row in the second plane at the same time as the destructive pulse from last said means to determine which rows indicate compare during the pulse from last said means, and means to select all of the rows in the second plane which indicate compare.

2. In a two dimensional multiple response resolver utilized to analyze sense signals from each word stored in a digital storage system resultant from an associative memory function the combination of a first plane containing standard toroidal cores mounted in columns and rows therein corresponding to the columns and rows of words in the digital storage system, a second plane mounted parallel to said first plane containing standard toroidal cores mounted in columns and rows therein in alignment to each column and row in said first plane, means to set every core in both planes to the state representing its corresponding sense signal, means to simultaneously sense by a destructive read-out each column of cores in the first plane to detect which columns have cores therein indicating compare, means to select one of the column of cores in the first plane which indicates compare, means to destructively sense each row in the column in the second plane corresponding to said selected column in the first plane to determine which rows indicate compare, and means to select all of the rows in the second plane which indicate compare.

References Cited by the Examiner

UNITED STATES PATENTS

| | | | |
|---|---|---|---|
| 3,031,650 | 4/1962 | Koerner | 340—174 |
| 3,199,082 | 8/1965 | Haibt | 340—172.5 |
| 3,221,308 | 11/1965 | Petersen et al. | 340—172.5 |
| 3,222,645 | 12/1965 | Davis | 340—146.2 |

OTHER REFERENCES

Kiseda et al., A Magnetic Associative Memory, IBM Journal, April 1961, pp. 115–118.

ROBERT C. BAILEY, *Primary Examiner.*

R. M. RICKERT, *Assistant Examiner.*